US012518023B1

(12) United States Patent
Guo et al.

(10) Patent No.: US 12,518,023 B1
(45) Date of Patent: Jan. 6, 2026

(54) GENERATING PATCHES FOR VULNERABILITY REMEDIATION IN TEMPLATES

(71) Applicant: Amazon Technologies, Inc., Reno, NV (US)

(72) Inventors: Shengjian Guo, Sunnyvale, CA (US); Yingjun Lyu, Los Angeles, CA (US); Georgios Argyros, New York, NY (US); Hoan Anh Nguyen, Bothell, WA (US); Zhixing Xu, Sunnyvale, CA (US); Qiang Zhou, San Jose, CA (US); Wen-Hao Chiang, San Jose, CA (US); Omer Tripp, San Jose, CA (US); Michael McDougall, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 170 days.

(21) Appl. No.: 18/475,604

(22) Filed: Sep. 27, 2023

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC ........ G06F 21/50; G06F 21/57; G06F 21/577; G06F 2221/033; G06F 2221/034
See application file for complete search history.

(56) References Cited

U.S. PATENT DOCUMENTS

| | | | |
|---|---|---|---|
| 9,754,112 B1* | 9/2017 | Moritz | G06F 21/54 |
| 2014/0189654 A1* | 7/2014 | Keromytis | G06F 11/3688 717/126 |
| 2015/0242631 A1* | 8/2015 | Cabrera | G06F 21/577 726/25 |
| 2021/0004217 A1* | 1/2021 | Halter | G06F 8/71 |
| 2024/0193277 A1* | 6/2024 | Manuel-Devadoss | G06F 21/552 |

* cited by examiner

*Primary Examiner* — Boris D Grijalva Lobos
(74) *Attorney, Agent, or Firm* — Hogan Lovells US LLP

(57) ABSTRACT

Systems and methods provide for analysis, identification, and automated repair of portions associated with configuration files or templates. The portions may be analyzed using different rules-based approaches to identify various vulnerabilities and their locations. The vulnerability and location information may be provided to a fixing service to implement different remediation workflows to identify specific areas within the portions associated with the vulnerabilities and to apply one or more patches to address the vulnerabilities. The patched files may then be validated and released for use.

20 Claims, 8 Drawing Sheets

GENERATING PATCHES FOR VULNERABILITY REMEDIATION IN TEMPLATES

BACKGROUND

Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to obtain access to these resources. The user may wish to leverage different capabilities to expediate certain operations within the cloud, such as using infrastructure-as-code templates to model and set up cloud resources and their properties. The templates may be generated and maintained by a user, which may have certain security vulnerabilities that are discovered as different parameters change and/or due to a lack of understanding by the user creating the template. Even if these vulnerabilities are discovered, the knowledge, skill, and available time for the user may cause delays in repairing the vulnerabilities.

BRIEF DESCRIPTION OF THE DRAWINGS

Various embodiments in accordance with the present disclosure will be described with reference to the drawings, in which.

DETAILED DESCRIPTION

Figure 1:
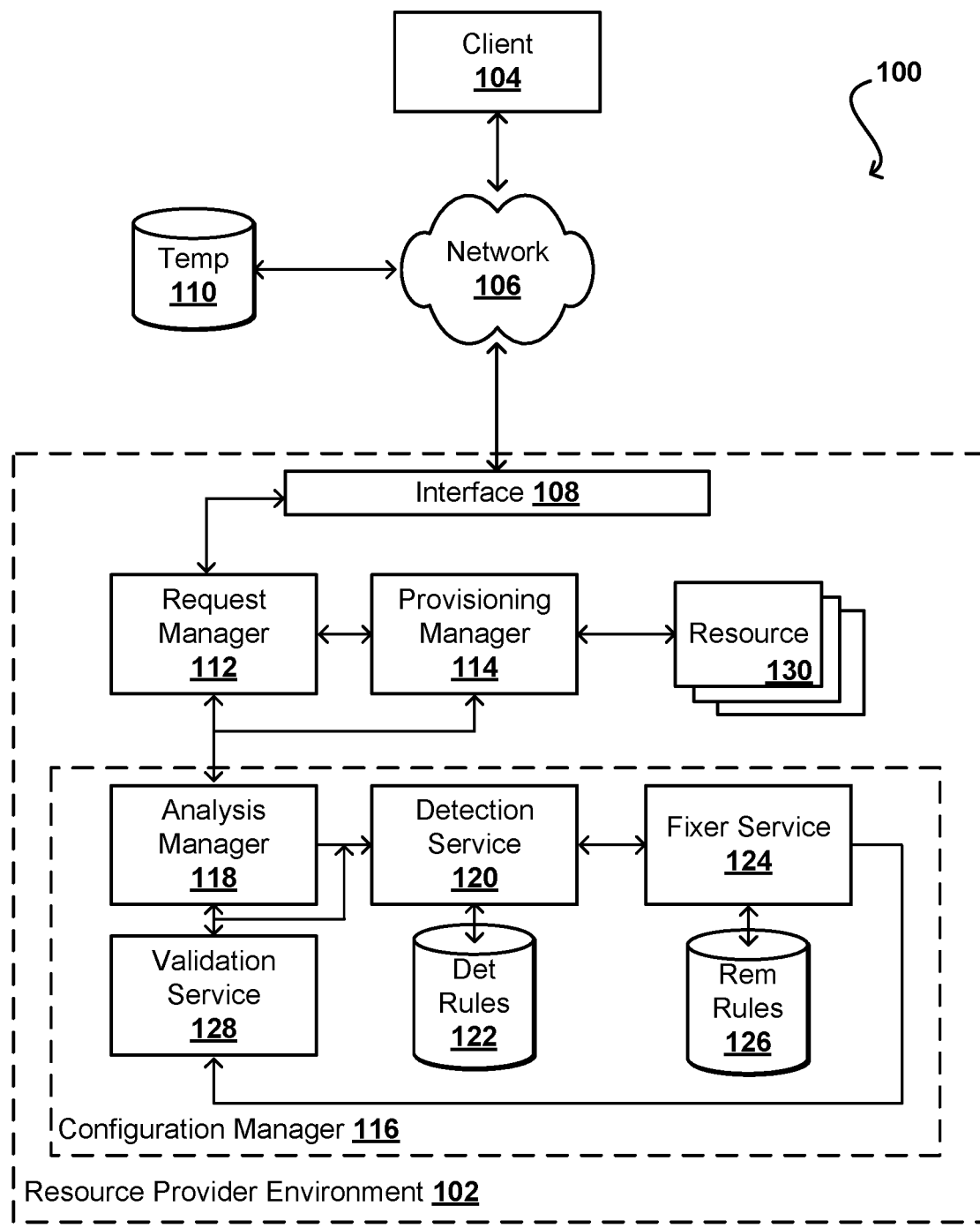
FIG. 1 illustrates an example system for evaluating and remediating vulnerabilities in templates and/or configurations in accordance with various embodiments.

Users may utilize services offered by a resource provider with one or more provisioning engines in order to manage and execute various tasks associated with one or more resources, such as cloud resources, serverless resources, locally hosted resources, on premises resources, and various others. These provisioning engines may be tools for infrastructure as code (IaC) and may automatically manage, monitor, and provision resources (e.g., compute resources, storage resources, virtual machines, etc.) through code instead of through manual processes. For example, one or more configuration files (e.g., templates) may be created that contain infrastructure specifications, simplifying the process for users to edit and distribute configurations. A number of different services can be associated with different templates for a given organization, and as a result, managing, validating, and updating the templates may be difficult. In the event that a vulnerability (e.g., a security vulnerability, a misconfiguration, a provisioning error, an outdated or expired portion, etc.) is detected or recognized within a given template, the vulnerability may remain until the user actively updates or modifies the template. Embodiments of the present disclosure are directed toward identifying potential vulnerabilities within various templates or configurations (e.g., within portions within the templates or configurations) and deploying one or more remediations to patch or repair the portions associated with the potential vulnerabilities. In various embodiments, a vulnerability detector may analyze different templates, for example based on one or more detection rules, and then provide the results of the analysis to a remediation manager that may receive the template, an identification of the potential vulnerability, a location of the vulnerability, and/or the like. The remediation manager may then deploy a fixer to parse through the portion to identify the vulnerability and one or more additional portions associated with the vulnerability, such as along a path in a tree structure, and then determine a remediation approach. The remediation may be applied and then validated to determine whether applying such an approach created other vulnerabilities or did, in fact, solve the problem associated with the vulnerability. In this manner, templates may be automatically evaluated and repaired, thereby reducing overhead on the user associated with the template and reducing the required knowledge for users to implement the suggested remediation actions, while also providing the benefits of improved security and reduced risks of misconfiguration.

Various embodiments of the present disclosure are directed toward one or more services to analyze and repair portions associated with a distribution environment, which may include, but is not limited to, templates or configurations associated with different IaC operations and infrastructure. Templates and/or configurations, which may be referred to interchangeably or as separate portions associated with an IaC operation, may include various portions or specified parameters that are used to submit instructions to execute one or more operations with a resource provider environment, such as to initialize resources or to request input information from a user, among other options. For example, a given template may be associated with one or more cloud resources and may be a formatted text file that describes the associated infrastructure. These templates may be formed from different objects, which may also be referred to as portions or segments, including, by way of non-limiting example, format versions, descriptions, metadata, parameters, mappings, conditions, transforms, resources, and outputs. Each of these portions may be associated with one or more vulnerability checks that are provided by the resource provider environment, such as checking to determine whether a resource has inadvertently been made publicly accessible, checking whether encryption is necessary, and/or the like. Upon receipt, systems and methods may analyze different portions, for example using a set of rules, to identify different potential vulnerabilities. The vulnerabilities may be associated with different configuration settings, portions, lack of or missing portions, and/or the like. The identified portion associated with a given rule may then be mapped to a security finding that reports the rule to the user (e.g., to an entity submitting the template for review). The reporting may include the identified vulnerability, a location of the vulnerability within the template, a path to identify the portion associated with a tree structure, and/or the like. A remediation rule may then be executed, using the reporting information, to parse the portions into a tree structure, follow the identified path to identify the vulnerability, and then apply one or more remediation actions based on one or more different rules, among other options. Once the remediation is applied, the patched version of the template may then be tested to determine whether the previously detected vulnerability is solved and/or to verify that patching the vulnerability did not introduce new vulnerabilities or errors. In this manner, an automated system may be deployed to analyze, identify, patch, and verify different templates or configurations.

Systems and methods of the present disclosure may be used to leverage IaC templates that enable users to build cloud infrastructure and applications by executing a configuration script. One or more services may permit users to provide templates in a variety of different formats and styles (e.g., JavaScript Object Notation (JSON), YAML, etc.) to simplify infrastructure management and minimize deployment risks. Because of the ephemeral characteristics of cloud deployments, various templates can and often do change, and misconfigurations due to these changes may potentially introduce risks to production deployments. Scanning various templates, for example using a service provided by a service provider that uses the templates to deploy the resources, may be useful for identifying the misconfigurations, but the onus still lies on the user to fix the misconfigurations in a timely manner to avoid the risks associated with using an outdated template. Systems and methods address and overcome this problem by not only identifying the vulnerabilities, but also deploying patches to fix various vulnerabilities without user interaction and/or modifications. To this end, various embodiments are directed toward an automated reasoning-assisted auto-remediation approach to identify and fix misconfigurations and/or vulnerabilities and also to verify that changes both have solved identified vulnerabilities and have not inadvertently introduced additional vulnerabilities or problems. In at least one embodiment, a fixer (e.g., fixer service, repair module, fixing module, fixing service, etc.) combines a set of detective rules, an analysis platform (e.g., a static analysis platform), a set of remediation rules, and a backend automated-reasoning engine invocation. A detective/remediation rule pair may target a specific security-related misconfiguration. Each remediation rule may be used to parse a template into a tree representative, map a security finding reported by a detective rule to the tree, analyze the insecure configuration blocks, pinpoint candidate remediation locations, and create a piece of repaired configuration as output. The analyzer may provide a running bed, exchange input/output with the detective rule, and execute the remediation rule to generates patches to mitigate an insecure configuration. The automated reasoning engine may be deployed to answer whether a security property is satisfied or not after remediation.

FIG. 1 illustrates an example system 100 for analyzing, detecting, remediating, and verifying a patch and/or modification to one or more templates or configurations, in accordance with various embodiments of the present disclosure. In this example, a resource provider environment 102 is used to host or otherwise provide access to one or more underlying resources, such as compute resources, storage resources, and/or the like. It should be appreciated that various other components may also be included, or hosted separately in a different environment, and are not shown for clarity with the following discussion. Furthermore, these components are shown by way of example and are not intended to limit the scope of the present disclosure. These resources can include physical and virtual resources that may be located at one or more locations controlled by the provider or a third-party, or may be located at a location controlled by the user, or an entity with which the user is associated. Moreover, various resources may be illustrated as separate blocks or components, but different embodiments may group or otherwise share functionality between different blocks or components.

In this example, a client 104 (e.g., a user, an end-user, an authorized user, a customer, etc.) can obtain access to or provision one or more resources provided as part of the resource provider environment 102. The client 104 may use one or more client devices to access the resources of the resource provider environment 102 over one or more networks 106. The client 104 and/or the client device may be referred to interchangeably in that the client device facilities the interaction with the resource provider environment 102. Moreover, the client device may execute one or more actions or tasks according to one or more rules or instructions stored on different memories such that physical interaction or explicit instructions from the client 104 are not used. By way of example only, the client device may correspond to a computing device programmed to send a signal to add or remove resources responsive to one or more metrics. The client device can include any appropriate electronic device operable to send and receive requests, messages, or other such information over an appropriate network and convey information back to a user of the device and/or convey information that can be confirmed or otherwise analyzed by software executing on the device. Examples of such client devices include personal computers, tablet computers, smart phones, notebook computers, various edge devices, and the like. The network(s) 106 can include any appropriate network, including an intranet, the Internet, a cellular network, a local area network (LAN), or any other such network or combination, and communication over the network can be enabled via wired and/or wireless connections. The resource provider environment 102 can include any appropriate components for receiving requests and returning information or performing actions in response to those requests. As an example, the provider environment might include Web servers and/or application servers for receiving and processing requests, then returning data, access to resources, Web pages, video, audio, or other such content or information in response to the request.

The resource provider environment 102 may be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to client commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network may implement various computing resources or services, which may include a virtual compute service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services (referred to in various implementations as cloud disks service, a managed disk service, a storage area network service, a persistent disk service, or a block volumes service), or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In various embodiments, the resource provider environment 102 may include various types of electronic resources that can be utilized by multiple users for a variety of different purposes. In at least some embodiments, all or a portion of a given resource or set of resources might be allocated to a particular user or allocated for a particular task, for at least a determined period of time. This can include, for example, enabling a customer to launch one or more instance of one or more types of these resources. In at least one embodiment, a resource instance can include storage volumes, compute instances, and network interfaces, among other such options. This can include, for example, enabling a customer to launch one or more instances of one or more types of these resources. The sharing of these multi-tenant resources from a provider environment is often referred to as resource sharing, Web services, or "cloud computing," among other such terms and depending upon the specific environment and/or implementation.

In one embodiment, the resource provider environment 102 can correspond to a service provider that, in addition to providing access to the resources, may also provide additional monitoring and management services, which can use resource capacity from one or more storage solutions, among other options, to provision resources and/or execute various tasks associated with a user account. In this example, a request to the resource provider environment 102 can be received by an interface layer 108 of the environment. As known for network environments, the interface layer can include components such as interfaces (e.g., application programming interfaces (APIs)), load balancers, request and/or data routers, and the like. In various embodiments, the request may include a command or an input, which may be accompanied by additional data, such as a file upload that may correspond to one or more configurations or templates associated with IaC resources. Files may also be retrieved from one or more template datastores 110, which may be accessible over the network 106, for example responsive to received instructions from the client 104. Further, in various embodiments, the one or more template datastores 110 may also be stored within the resource provider environment 102, for example as part of a set of storage resources that are associated with one or more authorized users of the resource provider environment 102.

A request may be associated with a variety of different resources, applications, extensions, storage solutions, and the like. In at least one embodiment, a request may be a provisioning request in which the client 104 requests the use and/or modification of one or more resources associated with the resource provider environment 102. Provisioning may refer to a set of features that are used to create and manage resources as defined in one or more products. For example, the resources may be cloud resources that the client may access based, at least in part, on one or more authorized accounts accessible to the client 104. In this example, the request may be provided to a request manager 112. The request manager 112 may be referred to as an entry-point for provisioning one or more APIs and/or may perform validation services. While not illustrated in FIG. 1, the request manager 112 may further access and/or receive information from various catalogs or libraries associated with the resource provider environment 102. For example, a catalog may be accessible to obtain metadata or other instructions associated with different provisioning requests. Moreover, the request manager 112 may be used to validate credentials from the client 104 to ensure that client 104 is authorized to submit various requests.

In at least one embodiment, the request manager 112 may retrieve a template or configuration from the datastore 110, for example by submitting a separate request to pull or otherwise receive the appropriate information, or may receive the template as part of the request submitted by the client 104, among other options. For example, the templates may be stored within the resourced provider environment 102 as being associated with an account for the client 104. As a result, the request may include an instruction to identify and retrieve the template from one or more datastores.

As noted herein, systems and methods may be directed toward the provisioning, management, and/or use of various resources, which may also be referred to as cloud resources. Because individual resource management may be time consuming and challenging, IaC configurations and/or templates may be used create and/or manage a collection of resources. The template datastore 110 may include one or more templates or configurations for different resources or sets of resources that may be in the form of a formatted text file (e.g., using JSON or YAML to describes the resources). The different templates may include a variety of objects in order to describe the resources and/or conditions for using the resources. For example, a format version may be included to define the capability of the template and/or manage different versions. A description may also be included to include comments regarding the template. Different templates may also incorporate metadata and a variety of parameters may also be specified within the template. The parameters may be used to customize the template and may be changed to modify how different resources are deployed or managed at runtime. Various embodiments may also include mappings within the templates to map keys to corresponding named values, such as those specified for a conditional parameter. Templates may also include one or more conditions to define whether certain resources are created or when resources properties are assigned to a given value. For example, conditions may be deployed for creating resources in different contexts and may include one or more intrinsic functions. Transforms may enable reuse of template components. Various templates will also define one or more resources associated with a resource provider environment, such as a storage resource or a compute resource. One or more templates may also include an output section for importation into other stacks.

A provisioning manager 114 may be used for fulfillment of the provisioning request, as well as various validation and/or orchestration operations. For example, the provisioning manager 114 may include various APIs and workflows in order to orchestrate provisioned product transitions and one or more provisioning operations. These operations may be split into multiple parts, including at least asynchronous APIs and synchronous workflows. The synchronous workflows may be responsible for validating inputs, confirming the provisioned product is available for the requested operation, locking the provisioned product, and/or starting the asynchronous workflow. The asynchronous workflow may be responsible for fulfilling the provisioning operation as well as transitioning the provisioned product through relevant states and then providing availability when the operation is complete. Operation fulfillment may be done using one or more different provisioning engines, such as a native engine or a third-party engine using systems and methods of the present disclosure. In at least one embodiment, the workflows may be replaced or otherwise used along with a specific start operation API to reduce a likelihood of the workflow locking due to various errors. The API may update associated records with a transaction to attach operation context to the records. In at least one embodiment, the provisioning manager 114 may be used to generate and/or route one or more artifacts associated with the provisioning request.

Because different configurations for IaC provisioning may change over time, different templates may become outdated or stale, which may cause vulnerabilities, problems with launching, and/or the like. For example, an outdated template provided to the provisioning manager 114 may not load properly and/or may inadvertently introduce vulnerabilities into client operations. Accordingly, systems and methods of the present disclosure may incorporate a configuration manager 116 to identify potential misconfigurations and/or vulnerabilities within difference templates, to deploy a rules-based approach for addressing and/or fixing the identified misconfigurations and/or vulnerabilities, and to validate any changes to the template. In this manner, clients may benefit from having their configurations and/or templates checked using an automated process that can implement or suggest remediation actions, which may reduce a workload for the client and/or reduce a needed level of skill for adjusting or otherwise maintaining different configurations and/or templates.

Prior to provisioning the configuration and/or template, the request manager 112 may provide the template to the configuration manager 116 for evaluation. An analysis manager 118 may receive the configuration and/or template, along with various other associated information, such as application information, configuration details, and/or the like. The analysis manager 118 may service as an initial interface and/or API that the user and/or requestion manager 112 may call in order to analyze different templates and/or configurations. In operation, the analysis manager 118 may be set to operate automatically, for example whenever a user provides a template to be provisioned within the environment, or may be executed based on a direct command and/or as part of one or more workflows. The analysis manager 118 may also be used to bypass or otherwise halt different operations of the configuration manager 116. For example, if it is determined that a template does not include any vulnerabilities, the analysis manager 118 may halt or otherwise stop different services, such a fixer service described herein, from executing changes or remediation actions to the template. In at least one embodiment, the analysis manager 118 may provide the template to a detection service 120 that may analyze the template and/or one or more portions of the template. Furthermore, the detection service 120 may also use additional information provided by the client 104 and/or the analysis manager 118, such as contextual information associated with the request. The analysis may use a rules-based approach, which may be acquired from a detection rules datastore 122. The rules-based approach may list particular configurations or functions that have a known or high probability of being improperly configured, such as inadvertently setting a storage location to public or whether or not to require encryption for certain configurations. Furthermore, one or more rules may be associated with particular operations or themes, such as encryption, access, and/or the like. The detection service 120 may be used to evaluate and parse portions of the template, which may include parsing the template into a tree representation to map a security finding to a given rule. For example, the tree representation may include a set of root and leaf nodes that can be traversed to visualize or explain how different variables, functions, and/or the like affect other portions of the template. For example, if a given variable is misconfigured and is used in a variety of locations, this variable may appear along multiple different paths and be associated with a variety of different nodes.

In at least one embodiment, the detection service uses the set of rules from the detection rules datastore 122 to scan the input template and output a set of security findings. Security findings may include information such as a description of a problem, a location of the problem, a path associated with the problem, and/or the like. By way of example, the description may be a "misconfiguration" or "security" vulnerability, among other options. The location may be a specific line of code and/or a description of how to identify the location associated with a given tree representation, among other options. Furthermore, as noted herein, the security findings may also determine that there are no known misconfigurations or vulnerabilities within the template, and as a result, operation of the configuration manager 116 and/or portions of the configuration manager 116 may be halted and/or otherwise determined as not necessary for using the template.

The security findings may be provided to the analysis manager 118 and/or to a fixer service 124. For example, an initial analysis may be provided to the analysis manager top determine whether the fixer service 124 needs to be called, such as in a situation where the detection service 120 does not identify known or expected misconfigurations or vulnerabilities. However, in at least one embodiment, identification of one or more misconfigurations or vulnerabilities may cause the detection service 120 to output the security findings directly to the fixer service 124 as part of a remediation workflow. The illustrated fixer service 124 process to the security findings in order to identify one or more remediation operations, which may be based on set of remediation rules in a remediation rule datastore 126 that are mapped to one or more of the detection rules in the detection rules datastore 122. Accordingly, the security findings may be used to identify one or more rules for fixing the vulnerabilities and/or misconfigurations associated with the security findings. For example, for each remediation rule, the fixer service 124 may parse the template to a tree representation and substitute variables with a parsing library to navigate to the vulnerable location, which may include using the location information (e.g., line number, path along the tree, etc.) obtained from the detection service 120. A remediation solution may be selected, which may be based, at least in part, on rule logic from the rules in the remediation rule datastore 126. For example, there may be multiple possible remediations for a given problem, so contextual information and/or other data provided by the detection service 120 and/or within the remediation rules may be used to select a particular remediation solution. By creating a path to a specific remediation location and identifying information, such as the line number associated with the remediation solution, a patch can be generated and then applied to the template. In at least one embodiment, an updated or patched template may then be validated by a validation service 128, for example, the validation service 128 may execute the detection service 120 on the updated template to determine whether any new findings are identified or may implement an automated reasoning-based analysis to verify the template and/or the portion of the template associated with the patch. Furthermore, the validation service 128 may include one or more automated reasoning-assisted remediation approaches for different portions of the template and/or patched template. Thereafter, a validated, updated template may be provided to the provisioning manager 114, which may then configure one or more resources 130 based on the template.

Various embodiments may deploy the configuration manager 116, which may include or be associated with various systems and/or services, to evaluate, repair, and validate insecure and/or misconfigured configurations using an automated reasoning-assisted auto-remediation approach. In at least one embodiment, the fixing service 124 uses findings from the detection service 120, which may be based on an analysis of different portions of a configuration or template using one or more rules of the detection rules datastore 122. In operation, a rule may be selected and used to scan a given template file and output security findings. Each finding may include a message describing the problem and the vulnerable locations. Each detective rule may also map to a remediation rule, such as a rule in the remediation rules datastore 126, which is accessible by or part of the fixing service 124. In at least one embodiment, for each remediation rule, the fixer service 124 may execute a step-by-step approach to generate a remediation. As noted herein, the various approaches may be done in a different order, or in parallel or at least partially in parallel, unless otherwise specifically stated. Furthermore, there may be more or fewer steps, as different steps may be particularized for a given rule or potential vulnerability or misconfiguration. Various steps to generate a remediation may include parsing a template to a tree representation and substituting the variables with a parsing library, navigating to the vulnerable location reported by the detection service 120 in the analyzable tree representation, analyzing and choosing the proper remediation solution according the remediation rule logic, creating a path of configuration items from tree entry to a specific remediation location in the tree, computing the line number of the path tail location and generating a patch containing the remediated configurations, outputting the generated patch to the validation service 128, and performing automated reasoning-based analysis to ensure correct remediation.

Various embodiments may be used to generate different remediations or fixes to identified problems with different portions of a configuration and/or template. For example, embodiments may be used to deploy self-contained fixes and/or automated reasoning dependent fixes. With self-contained fixes, if the fix of a misconfiguration only needs changes of specific configuration values and such changes have no side effects to other configuration items, such a fix may be referred to as self-contained fix. One example would be to update a variable value for a given function. Implementing this type of change does not affect other configurations in the same function, and therefore, is unlikely to cause additional vulnerabilities or misconfigurations in the other portions of the template. In contrast, if the fix of a misconfiguration may affect other configuration items or the individual fix has correlated or dependent configuration items that also need proper checking, such a fix may be referred to as an AR-dependent fix. To produce a correct fix, one or more automated reasoning techniques may be deployed to determine whether a provided fix mitigates the flagged issue. AR-dependent fixes may be useful in cases where there are multiple options of a fix, but it is unknown which is the "best" or "optimal" fix. Accordingly, systems and methods leverage automated reasoning to help find a workable fix with minimum fix cost.

Embodiments of the present disclosure may overcome problems with only identifying errors, such as after deployment, and then relying on clients to effectively manage and update a variety of different configurations and/or templates. Systems and methods provide an extensible way of developing rules for the remediation. First, for remediation identification, the detection service 120 may synergistically calculate remediation location based on a detection rule, allowing identification of a problematic path in a tree representation of a template. Additionally, systems and methods may be used to calculate the accurate line numbers for remediation in templates using one or more accessible APIs. Second, for the remediation generation, embodiments provide a way to write a rule upon the static analysis framework to manipulate the template. For the remediation validation, if needed, embodiments leverage various AR-based techniques to validate if the performed fix indeed resolved the insecure misconfigurations.

Figure 2:
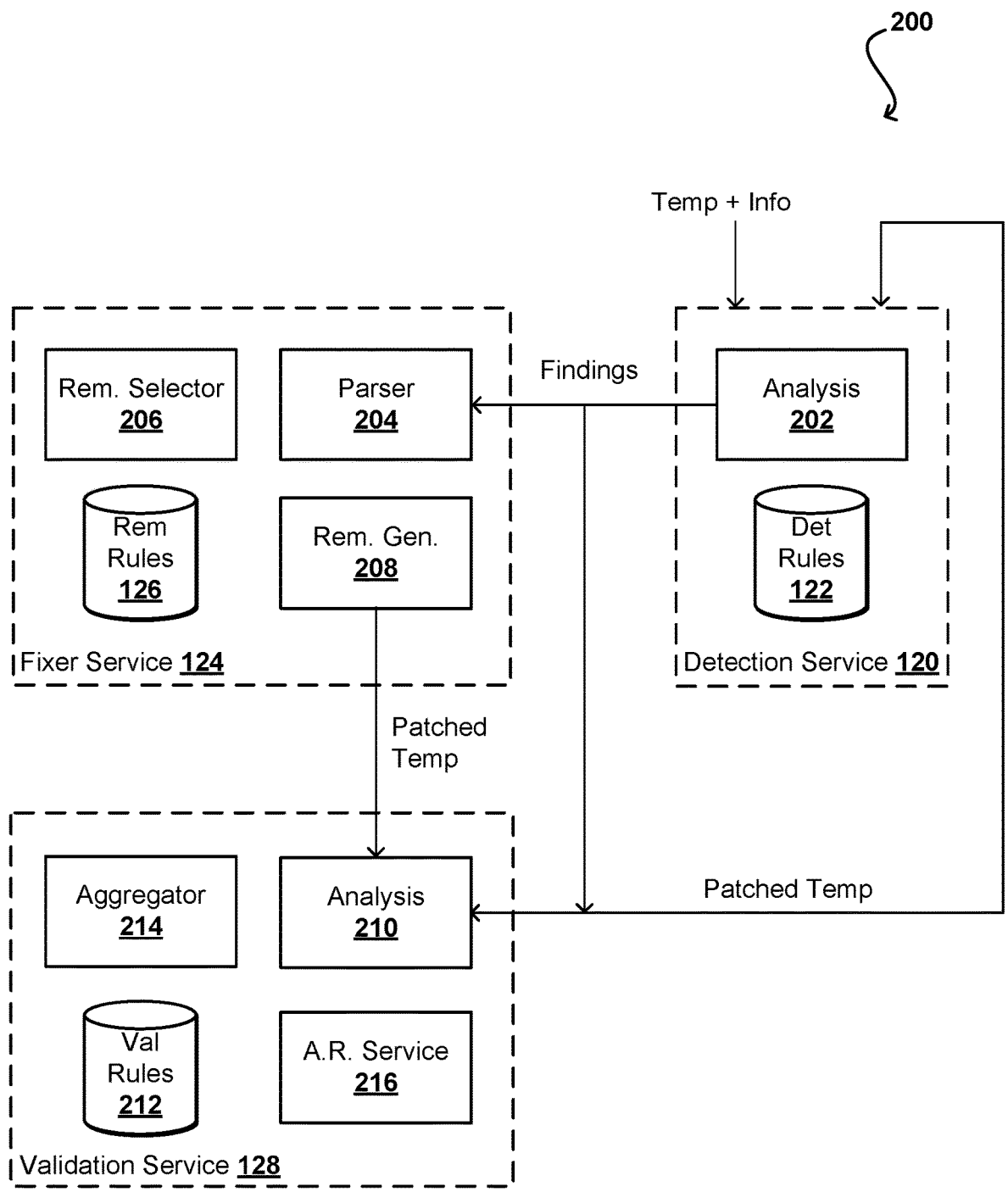
FIG. 2 illustrates an example environment for evaluating and remediating vulnerabilities in templates and/or configurations in accordance with various embodiments.

FIG. 2 illustrates an example environment 200 that can be used with embodiments of the present disclosure. As discussed herein, various components have been removed for clarity and, moreover, different components may be represented as being separate and/or included within other components, but this representation is for illustrative purposes only and not intended to limit or restrict the scope of the present disclosure, as various embodiments may include features, systems, or components that are separate from and/or accessible to other features, systems, and components. In this example, the client (e.g., a user, a workflow associated with a user, etc.) may provide a template and/or configuration along with representative information to the detection service 120 for review and evaluation. For example, the template and/or configuration may include one or more portions (e.g., code portions, objects, etc.) and/or additional information, such as other configuration files, contextual information, instructions, and/or the like. This information may be used to determine contextual information for the template, which may include determining and/or identifying dependencies within the one or more portions, identifying libraries or repositories associated with the one or more portions, and/or the like. For example, the one or more portions may include variables or functions that are used at multiple locations and/or may call different libraries where the vulnerabilities may be associated with the libraries and/or portions of the libraries. Various embodiments may include different templates and/or configurations with a variety of objects presented using different languages. As an example, different parameters may be presented using the JSON language, as well as mappings and/or resources, as shown below:

```
"Parameters": {
    "InstanceTypeParameter": {
        "Type": "String",
```

```
"Default": "t2.micro"
"AllowedValues" : ["t2.micro", "m1.small"],
"Description" : "Enter t2.micro, m1.small."}
}
"Mappings":
{
"Mapping01" : {
   "Key01" : {
     "Name" : "Value01"
   }
   "Key01" : {
     "Name" : "Value02"
   }
}
"Resources" :
{
"MyBucket" : {
"Type" : "Provider::Storage::Bucket",
"Properties" : {"ImageID" : "sxa-243t2343"}
}
}
```

As shown, the templates include one or more different portions, which may be associated with the objects (e.g., Parameters, Mappings, Resources, etc.) and/or features of those objects. Systems and methods may be used to evaluate the objects and their respective components to detect and repair misconfigurations and/or vulnerabilities.

As noted herein, the detection service 120 may include an analysis module 202 that applies one or more rules from the detection rules datastore 122 to generate security findings associated with the one or more portions and/or the additional information. For example, the one or more rules may be used to evaluate different portions to identify predicted or common areas (which may be determined by analyzing a number of different portions for different users to determine patterns or more likely errors), such as inadvertently setting different resources to public instead of private access, not including encryption or other security requirements, and/or the like. Different rules may be applied to different portions of the one or more portions and/or the contextual information, or in various embodiments, particular rules may be targeted for particular regions. As an example, certain rules may only be associated with particular types of resources, such as having a subset of rules for compute resources that are different from a subset of rules for storage resources. As a further example, rules may be associated with a particular client or organization, such as naming conventions, intended storage locations, and/or the like.

In at least one embodiment, the fixer service 124 receives, from the detection service 120, a set of security findings (e.g., information associated with one or more detected vulnerabilities, misconfigurations, or the like associated with the one or more rules). The security findings may include information associated with the findings (e.g., a label or description), a location of the detected findings (e.g., a line number in the template, a path to identify the findings in a tree structure, etc.), and/or contextual metadata or information associated with the findings. For example, the security findings may include a description such as "public access" or "no encryption" along with identification information (e.g., "line 43" or a path description). In at least one embodiment, the fixer service 124 may also take the information to generate or otherwise parse through a tree structure associated with the one or more portions, for example using a parser 204. The parser 204 may receive, as in input, the one or more portions and then parse or otherwise generate a tree structure representation. For example, a data item may be structured as a root note that that includes scalar, sequence, mapping, etc. nodes that further include their own branches and nodes, such as blocks and flows. As a result, the initial root may include various branches that extend to different leaf nodes. Parsing the input may provide a representation of both a location of an item associated with a vulnerability or misconfiguration and/or illustrate how such an item is connected to or dependent on different items.

In at least one embodiment, the fixer service 124 includes a remediation selector 206 that may determine a one or more rules-based approaches to patching or otherwise mitigating the vulnerability, for example, by using rules stored in the remediation rules datastore 126. The remediation selector 206 may select the rule based, at least in part, on a mapping generated by the detection service 120 between the rule used for the detection and the one or more remediation rules in the remediation rules datastore 126. That is, the specific rule and/or vulnerability used for generation of the findings may also guide the remediation selector 206 toward selecting a particular remediation rule, which as noted herein, may include a rules-based approach to mitigate vulnerabilities or misconfigurations associated with the findings.

The fixer service 124 may also include a remediation generator 208 that is used to generate one or more fixes associated with the findings, which may include changes to variables, updates to variable values, adding lines of code, removing lines of code, adding objects, removing objects, and/or the like. Furthermore, multiple changes may be associated with a single remediation, such as changing a variable at multiple different locations and/or removing code from different locations, among other options. Each remediation rule may include a number of different steps that can be executed by the remediation generator 208 in order to address the various findings. These steps may include, at least in part, creating a path to a specific remediation location associated with the parsed tree structure, computing a line number of the path tail location, generating a patch, applying the patch, and outputting a patched one or more portions. As noted herein, various steps of the approach may be performed by different components of the fixer service 124, such as the initial parsing or determining a location associated with the identified vulnerabilities.

In at least one embodiment, one or more portions may include more than one vulnerabilities and/or misconfigurations. For example, a first portion may have an improper security setting (based on the context of the first portion or an associated object) and a second portion may have a misconfigured end point. Systems and methods of the present disclosure may be deployed to work through a number of identified errors in a systematic manner where a first vulnerability is addressed by the fixer service 124 prior to addressing a second vulnerability. That is, a first vulnerability may be parsed, analyzed, patched, and then verified prior to mitigating the second vulnerability. In this manner, it may be determined whether or not fixing an individual vulnerability causes additional problems within the one or more portions. For example, if fixing a first vulnerability generates two additional vulnerabilities, such a fix may be undesirable and the fix may be reverted back to an original state and a different remediation rule may be applied. However, in various embodiments, multiple changes and rules may be applied in parallel (or partially in parallel).

The initial template and/or configuration may be patched and then provided to the validation service 128 to determine whether or not the remediation action performed by the fixer service 124 has cured the initially identified vulnerability. For example, unit testing may be performed using an analysis service 210. Furthermore, the patched version of the one or more portions may also be routed back to the detection service 120 to determine whether the initial findings are still relevant or identified after the patch is applied. In this manner, one or more portions may be incrementally tested and approved prior to moving on to addressing other portions. As noted herein, there may be multiple different rules applied to the one or more portions to generate the patched version, and the analysis service 210 may perform the unit testing using one or more validation rules from a validation rules datastore 212, which may be different based on the different types of rules and/or resources applied. Furthermore, if the one or more portions are associated with multiple different findings, an aggregator 214 may combine multiple patched versions into a single patched version for final testing to ensure that multiple changes have not caused additional vulnerabilities. In at least one embodiment, as noted herein, an automated reasoning service 216 may be deployed as part of the validation service to mathematically test and compare different portions, which may also use the one or more validation rules. Upon validating the changes to the template, the patched version may be stored to a datastore and/or provided back to the user and/or requestor for approval or further validation. The patched version may then be executed to provision one or more resources. As noted herein, if various portions are changed and/or patched, there may be situations in which a fully complete and/or verified template cannot be generated. As a result, one or more stop conditions and/or exit conditions may be specified in order to avoid infinite loops and/or to reduce processing times. For example, updated patches may be evaluated a set number of times and then a message may be generated, after the set number is exceeded, to inform users that the template cannot be fully verified and/or identifying errors for further evaluation and repair.

Systems and methods of the present disclosure may couple vulnerability remediation with static analysis/detection. For example, the detector service 120 may pinpoint the location and root cause of the vulnerability and gather contextual metadata for the fixer service 124 to identify the proper mitigation strategy and to implement the mitigation strategy. In some embodiments, APIs may be provided as a remediation library to enable encapsulation, optimization, and/or reuse of a variety of abstractions for security patches. As a result, one or more fixer services may be provided for a variety of vulnerabilities that may exist for external entity injection (XXE), cross site scripting (XSS), logging of sensitive data, and/or the like. Embodiments may also provide instructions/recommendations to fix vulnerabilities (e.g., the code changes to be made). In some embodiments, any number of fixer services 124 may be implemented, for example, different fixer services 124 may be associated with different types of resources and/or different vulnerability types. However, as shown in the example of FIG. 2, a fixer service may be configured to access different remediation rules and apply those rules to a variety of different scenarios.

For each potential vulnerability or misconfiguration that the detection service 120 detects and notes in the findings, at least one remediation strategy (e.g., remediation rule set) may be available. In embodiments, there may exist multiple remediation strategies, resulting in multiple potential rules-based approaches for a given vulnerability. Using the selected rule(s), the fixer service 124 may consume information provided by the detection service 120, identify the proper remediation strategy, adapt the fix to a specific software artifact (e.g., source code and/or configuration files), identify conditions for when it is safe to transform the code and how to safely transform the code, and how to turn the piece of code into a secure version that conforms to the selected remediation strategy.

In at least one embodiment, the fixer service 124 may use the information provided by the detection service 120 (e.g., the findings) as input in order to generate a context-dependent fix (e.g., patch). Based on analysis of the findings, the fixer service 124 may propose changes that are not exactly at the location of the vulnerability in the findings or that could affect the functionality of other parts of the template. In embodiments, other parts of the program affect what kind of remediation strategy the fixer service 124 will apply. By way of non-limiting example, the findings may be used is to mitigate XSS vulnerabilities, where an untrusted input is used unsafely in a web application's dynamic content. The fixer service 124 may add an encoding function to the input as part of the change. The insertion of such function(s) may or may not happen at where the detection service 120 reports the issue, which may typically be at the sink (e.g., the line that represents dynamic content execution). Depending on the remediation strategy, the change could be anywhere along the path starting from the untrusted source to the sink. In embodiments, the fixer service 124 may apply different encoding functions depending on context of the identified vulnerabilities (e.g., inserting a variable between HTML tags as opposed to placing variables into inline JavaScript which is then embedded in an HTML document). In some embodiments, in order to identify the correct remediation strategy and carry out the changes for the mitigation at the correct and/or optimal location, the static analysis is used to extract the necessary contextual information for the fixer service 124. In embodiments, different types of information may be defined and extracted based on the static analysis. As one example, one type of contextual metadata is a vulnerability context, which indicates a location of a vulnerable variable (e.g., where the variable is defined and used). Another example may include how a variable affects other parts of the template. A further example may include the context of use for the variable. Additionally, context information may also be associated with a selected remediation strategy (e.g., what types of functions and/or code are currently being used by the code to address potential vulnerabilities). For example, if there is an existing redaction library/API in use in other places in the template to redact sensitive data, the developer may prefer to reuse that same redaction API rather than introducing a different API.

As described herein, the fixer service 124 may consume information from the detection service 120 that may include an identification of the vulnerability, location information, and/or additional contextual information. The location information may represent where in the template the detection service 120 reports the issue to be (e.g., a particular line). The fixer service 124 may define where the remediation (e.g., change, patch, etc.) happens with respect to the identified remediation location. For example, the remediation may happen at the same line that the detection service 120 reports the issue to be, at neighboring lines, and/or at any other lines. In embodiments, the generation of proposed changes to the template is based on analysis of the template and additional contextual information.

Figure 3:
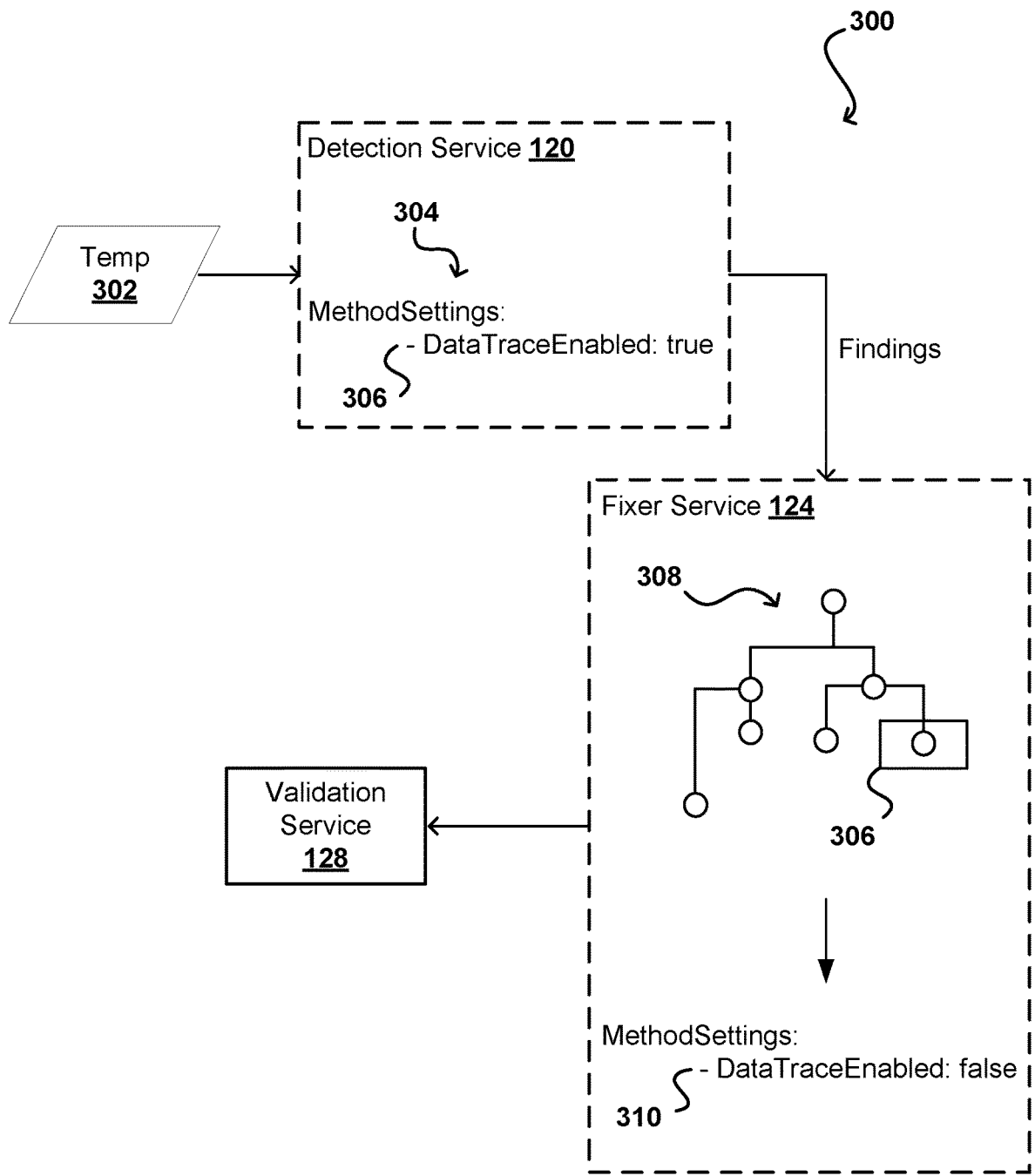
FIG. 3 illustrates an example environment for evaluating and remediating vulnerabilities in templates and/or configurations in accordance with various embodiments.

FIG. 3 illustrates an example environment 300 that may be used to analyze and modify one or more code portions. In this example, a template and/or configuration 302, which may be referred to as a template for convenience, is provided to the detection service 120 for analysis based on one or more rules. In this example, a portion 304 includes a vulnerability 306 associated with a value related to the function DataTraceEnabled. This vulnerability may be identified and provided, as part of the security findings, to the fixer service 124 for remediation. In at least one embodiment, the fixer service 124 may parse the portion (e.g., the objects associated with the portion) and/or the template 302, as shown, into a tree structure 308. The tree structure 308 may be associated with a path to the identified vulnerability 306. Upon analyzing the vulnerability, such as by linking a remediation strategy to a detection rule, a patch 310 may be applied to modify the function DataTraceEnabled. For example, in the initial portion, the value was "true" and now the value is "false." This modified portion may then be checked using the validation service 128 in order to ensure additional vulnerabilities were not introduced due to the change. In this manner, different rules can identify a variety of different vulnerabilities to be analyzed, patched, and evaluated to automatically repair the vulnerabilities.

Figure 4:
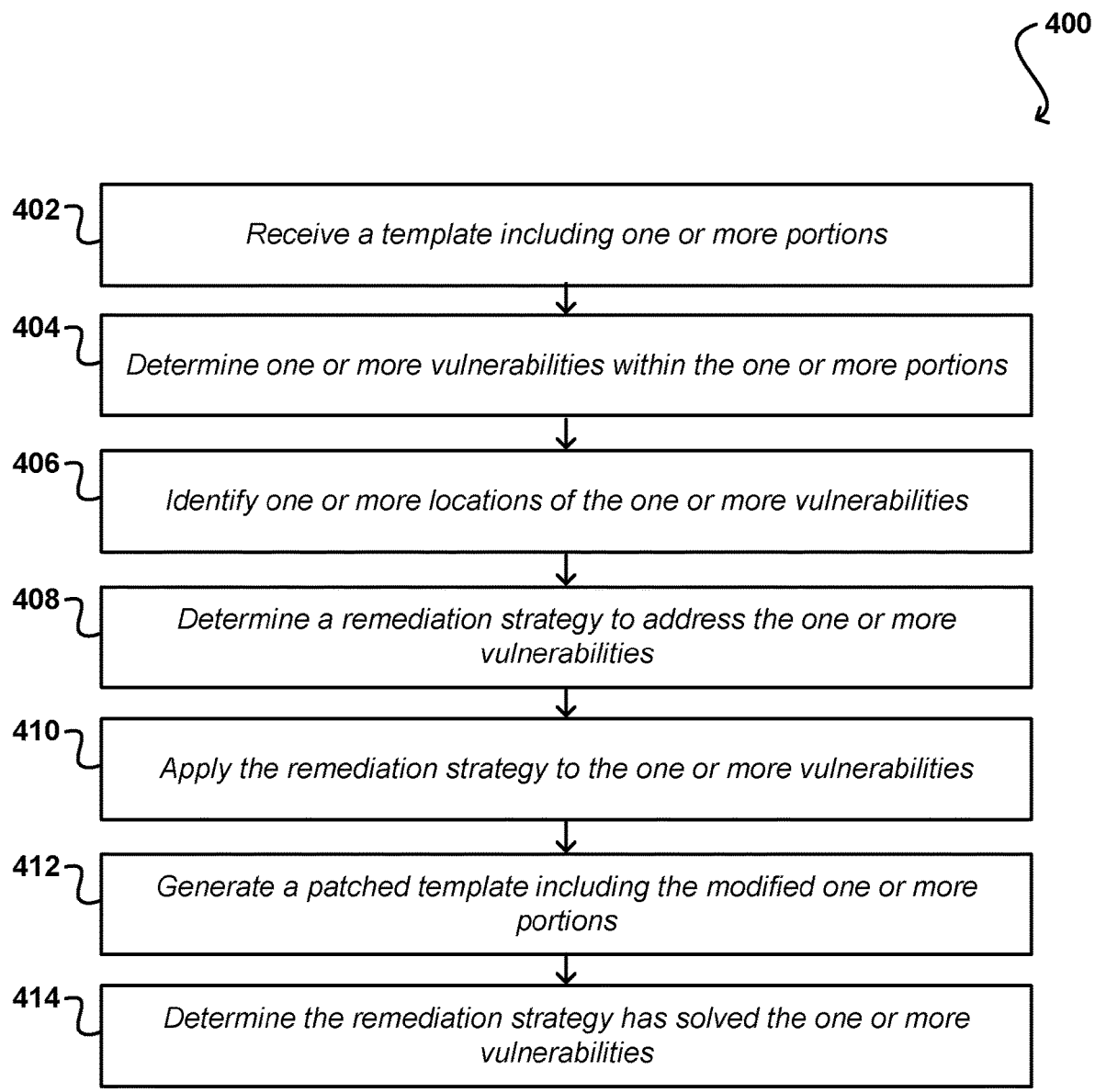
FIG. 4 illustrates an example process for identifying and remediating vulnerabilities that can be utilized in accordance with various embodiments.

FIG. 4 illustrates an example process 400 for identifying a vulnerability within a template and applying a remediation process that can be utilized in accordance with various embodiments. It should be understood that there can be additional, fewer, or alternative steps performed in similar or alternative orders, or in parallel, within the scope of the various embodiments unless otherwise specifically stated. In this example, a template and/or configuration is received that includes one or more portions 402. The template may be an IaC template used for provisioning one or more resources in a resource provider environment. The portions may include different objects, such as identifications of mappings or resources, and may also include one or more code portions, among other options. In at least one embodiment, the template may be written in a variety of different languages and information associated with a context of the template may also be used when identifying various vulnerabilities (e.g., misconfigurations, security vulnerabilities, etc.). The portions of the template may be analyzed to determine one or more vulnerabilities 404. Vulnerabilities may include security vulnerabilities, misconfigurations, and/or the like. The analysis may be based on one or more rules that are used to identify different types of vulnerabilities within the one or more portions, such as improperly set variable values, lack of encryption, and/or the like.

In at least one embodiment, one or more locations associated with the one or more vulnerabilities may be identified 406. The location may be associated with a specific line of the template and/or a path associated with a tree structure representation of the one or more portions. The location may enable pinpoint identification of both the vulnerability and also how the vulnerability affects other portions of the template, such as being provided as an input to a different function. Based, at least in part on the context in which the one or more vulnerabilities are used within the template, a remediation strategy may be determined 408. The remediation strategy may be mapped to the detection strategy used to initially find the vulnerability. In at least one embodiment, there may be multiple potential remediation strategies and one may be selected, for example, using context information.

The remediation strategy may be applied to the one or more portions to address and/or correct the one or more vulnerabilities 410. For example, portions may be added or removed, variable values may be changed, and/or the like. The remediation strategy may also include automatically adding or deleting lines of code from the template. The modified version of the template may then generated to create a patched template that includes the changes applied to the template using the selected remediation strategy 412. The patched template may then be validated 414 to determine whether the remediation strategy successfully resolved the one or more vulnerabilities. In this manner, various portions may be evaluated and repaired using different sets of rules to reduce vulnerabilities within a given input file.

Figure 5:
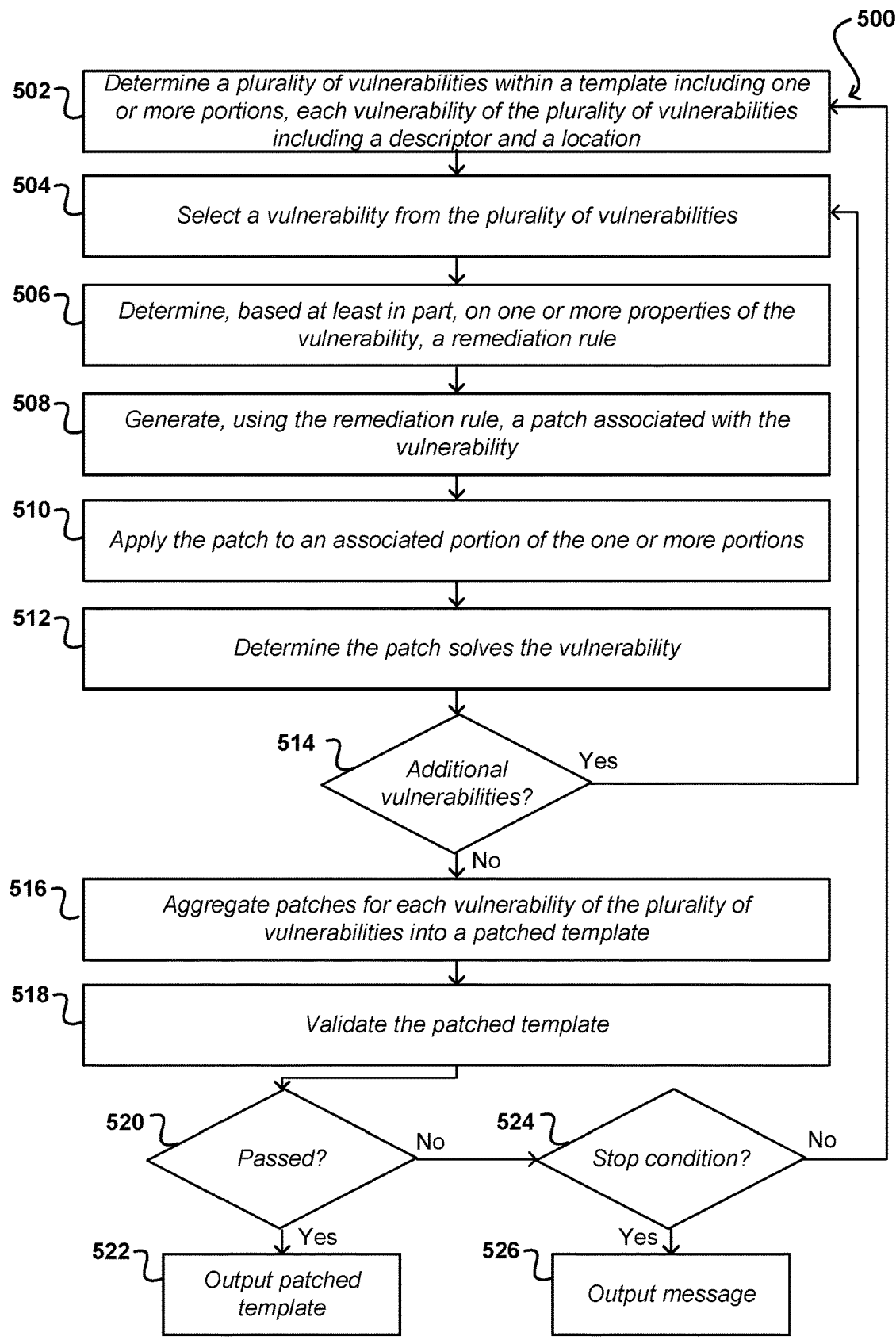
FIG. 5 illustrates an example process for identifying and remediating vulnerabilities that can be utilized in accordance with various embodiments.

FIG. 5 illustrates an example flow chart of a process 500 for evaluating and applying remediation rules to a template. In this example, a plurality of vulnerabilities within a template including various portions are determined 502. The vulnerabilities may be associated with a description, a location within different portions, or other identifying and/or contextual information. In at least one embodiment, the vulnerabilities may be identified using one or more different detection rules, where a particular rule may be associated with a particular type of vulnerability. A vulnerability of the plurality of vulnerabilities may be selected for repair 504, and a remediation rule for addressing and mitigating the vulnerability may be selected 506. The remediation rule may be mapped to the particular detection rule used to identify the vulnerability. In various embodiments, there may be multiple potential remediation rules that can be applied to a given vulnerability, and one rule may be selected based on contextual information, the location of the vulnerability, or other information. For example, a client associated with the template may have a preferred method for addressing and applying remediations and the rule associated with that method may be selected.

A patch may be generated using the remediation rule 508 and the patch may be applied to the one or more portions to update the template 510. For example, variable values may be changed, lines or code may be added or deleted, and/or the like. In at least one embodiment, the patch may be validated to determine whether the patch solves the vulnerability 512. Successful patches may be applied and stored and then the system may evaluate whether additional vulnerabilities for the template remain 514, and if so, may select another vulnerability to patch. If not, then each of the patches applied for the different vulnerabilities may be aggregated 516 into a patched template, which may be further validated 518 to ensure that each of the changes have not introduced additional misconfigurations or vulnerabilities. It may be determined whether the validation passes or fails 520. If the patched template passes the validation then the patched template may be output for use 522. However, if the patched template fails the validation then the failed patched template may repeat the process to identify and solve the new vulnerabilities, or may be rolled back to the original version for repeated processing. For example, after failing the validation the patched template may be evaluated against one or more stop conditions to determine whether a stop condition is satisfied 524. The stop condition may correspond to a number of times to process and/or evaluate a given patched template. The stop condition may be used in order to avoid potential infinite loops or delayed processing times to repeatedly evaluate a given patched template. If the stop condition is not reached, then additional processing may continue. If the stop condition is reached, then a message may be provided informing the user of the potential vulnerabilities and/or errors in the template for further evaluation 526.

Figure 6:
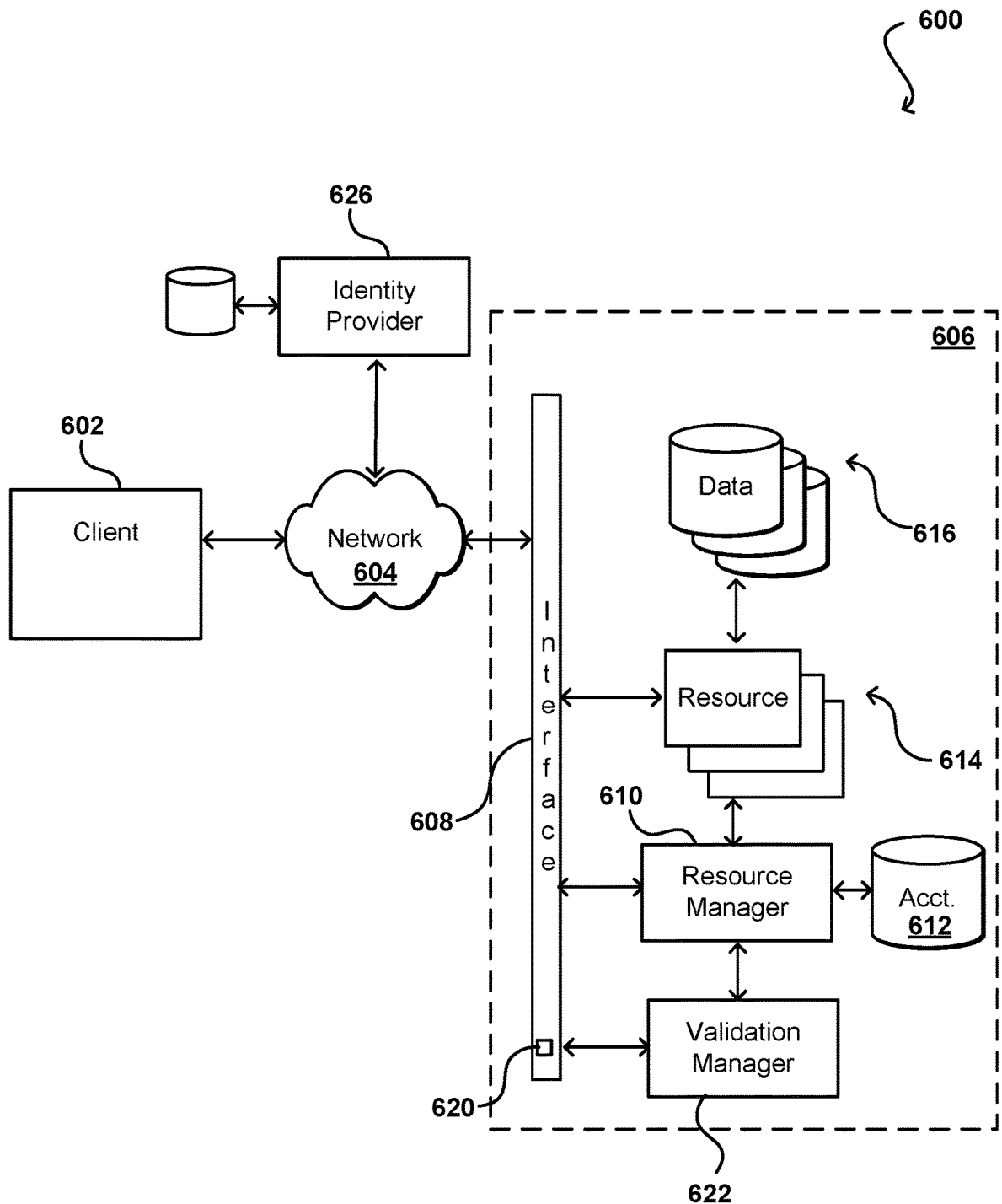
FIG. 6 illustrates an example environment in which aspects of various embodiments can be implemented.

FIG. 6 illustrates components of an example cloud computing environment 600 in which aspects of various embodiments can be implemented. In at least some embodiments, a user 602 wanting to utilize a portion of the resources 614 can submit a request over a network 604 that is received to an interface layer 608 of the provider environment 606. The interface layer can include application programming interfaces (APIs) or other exposed interfaces enabling a user to submit requests to the provider environment. The interface layer 608 in this example can also include other components as well, such as at least one Web server, routing components, load balancers, and the like. When a request to provision a resource is received to the interface layer 608, information for the request can be directed to a resource manager 610 or other such system, service, or component configured to manage user accounts and information, resource provisioning and usage, and other such aspects. A resource manager 610 receiving the request can perform tasks such as to authenticate an identity of the user submitting the request, as well as to determine whether that user has an existing account with the resource provider, where the account data may be stored in at least one data store 612 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 626, a key management service, a corporate entity, a certificate authority, an identify broker, and the like. In some embodiments, a user can provide information useful in obtaining the credentials, such as user identity, account information, password, user-specific cryptographic key, customer number, and the like. The identity provider can provide the credentials to the resource provider environment 606 and/or to the client device 602, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user, for example using a validation manager 622. If the user has an account with the appropriate permissions, status, etc., the resource manager 610 can determine whether there are adequate resources 614 available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. Additionally, the user may be granted access to data 616 associated with the user account. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 602 to communicate with an allocated resource without having to communicate with the resource manager 610, at least until such time as a relevant aspect of the user account changes, the user is no longer granted access to the resource, or another such aspect changes.

The resource manager 610 (or another such system or service) in this example can also function as a virtual layer of hardware and software components that handles control functions in addition to management actions, as may include provisioning, scaling, replication, etc. The resource manager 610 can utilize dedicated APIs 620 in the interface layer 608, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 608 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service.

Figure 7:
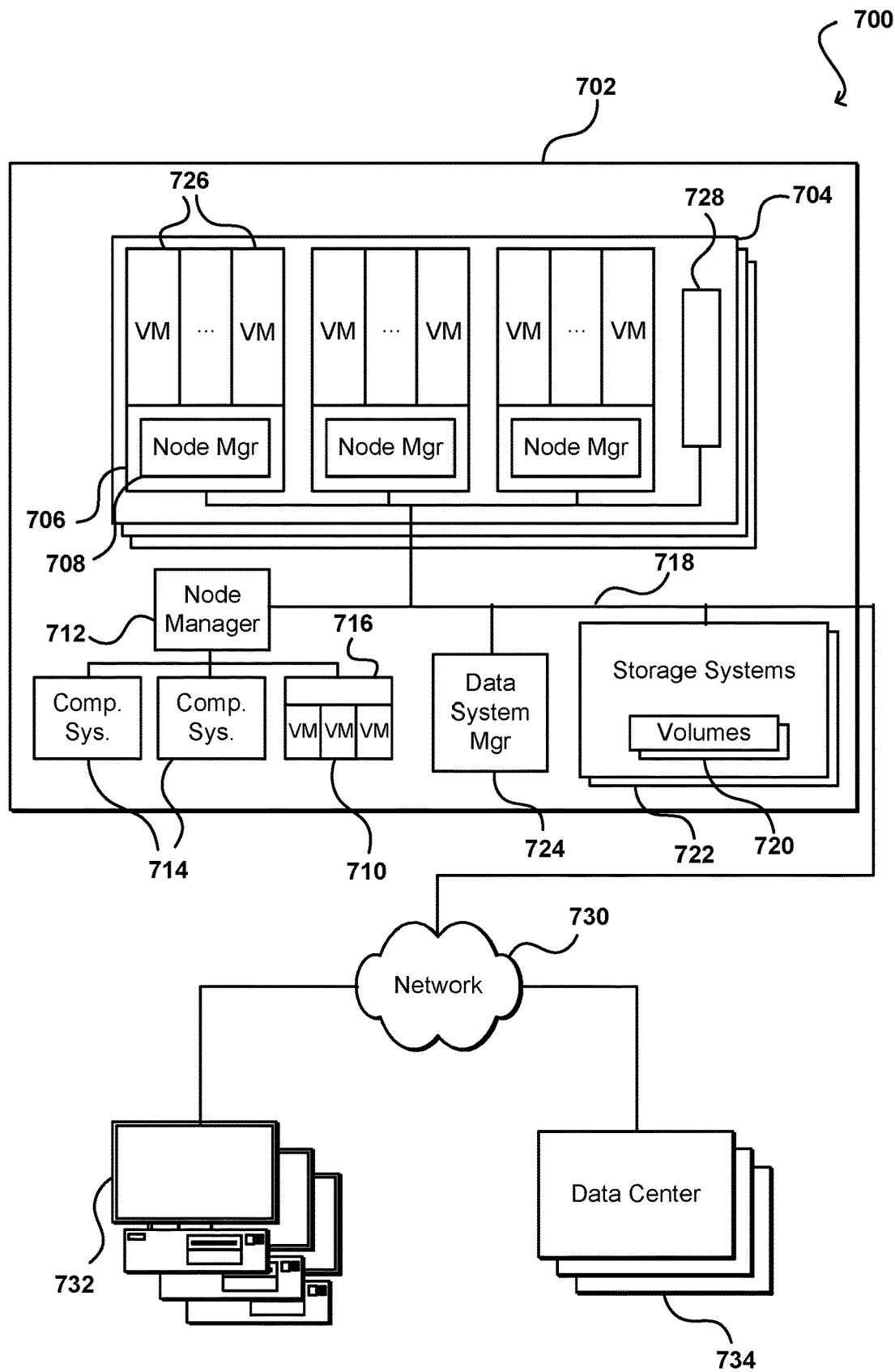
FIG. 7 illustrates components of an example data center that can be utilized in accordance with various embodiments.

FIG. 7 illustrates an example network configuration 700 in which such provisioning can be implemented in accordance with various embodiments. In this example configuration, multiple computing systems are operable to execute various programs, applications, and/or services, and further operable to access reliable block-based data storage, such as under the control of a block-based data storage service. In particular, in this example a block-based data storage service uses multiple block-based data storage systems in a data center to provide reliable, non-local, block-based data storage to executing programs or various other components, systems, or services. Multiple remote archival storage systems external to the data center may also be used to store additional copies of at least some portions of at least some block-based data storage volumes.

In this example, a data center 702 includes a number of racks 704, each rack including a number of host computing devices 706, as well as an optional rack support computing system 728 in this example embodiment. The host computing systems 706 on the illustrated rack 704 each host one or more virtual machines 726 in this example, as well as a distinct node manager module 712 associated with the virtual machines on that host computing system to manage those virtual machines. One or more other host computing systems 716 may also each host one or more virtual machines 710 in this example. Each virtual machine 710 may act as an independent resource node for executing one or more program copies or performing another such action or process for user data requests, I/O operations, etc. In addition, this example data center 702 further includes additional host computing systems 714 that do not include distinct virtual machines, but may nonetheless each act as a resource node for one or more tasks being executed for a user. In this example, a node manager module 712 executing on a computing system (not shown) distinct from the host computing systems 714 and 716 is associated with those host computing systems to manage the resource nodes provided by those host computing systems, such as in a manner similar to the node manager modules 708 for the host computing systems 706. The rack support computing system 728 may provide various utility services for other computing systems local to its rack 704 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 702 also includes a computing system 724 that executes a data storage system manager module for the block-based data storage service to assist in managing the availability of non-local block-based data storage to programs executing on resource nodes provided by the host computing systems located within the data center (or optionally on computing systems located in one or more other data centers 734, or other remote computing systems 732 external to the data center). In particular, in this example the data center 702 includes a pool of multiple block-based data storage systems 722, which each have local block-based storage for use in storing one or more volume copies 720. Access to the volume copies 720 is provided over the internal network(s) 718 to programs executing on various resource nodes 710 and 714. As discussed in greater detail elsewhere, a block-based data storage system manager module 724 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the system manager module 722 may coordinate with the node manager modules 712, 708 to manage use of volumes by programs executing on associated resource nodes, while in other embodiments the node manager modules may not be used to manage such volume use. In addition, in other embodiments, one or more system manager modules 724 may be structured in other manners, such as to have multiple instances of the system manager executing in a single data center (e.g., to share the management of non-local block data storage by programs executing on the resource nodes provided by the host computing systems located within the data center), and/or such as to have at least some of the functionality of a system manager module being provided in a distributed manner by software executing on some or all of the server block data storage systems 722 (e.g., in a peer-to-peer manner, without any separate centralized system manager module on a computing system 724).

In this example, the various host computing systems, server block data storage systems, and computing systems are interconnected via one or more internal networks 718 of the data center, which may include various networking devices (e.g., routers, switches, gateways, etc.) that are not shown. In addition, the internal networks 718 are connected to an external network 730 (e.g., the Internet or another public data network) in this example, and the data center 702 may further include one or more optional devices (not shown) at the interconnect between the data center and an external network (e.g., network proxies, load balancers, network address translation devices, etc.). In this example, the data center 702 is connected via the external network 730 to one or more other data centers 734 that each may include some or all of the computing systems and storage systems illustrated with respect to data center 702, as well as other remote computing systems 732 external to the data center. The other computing systems 732 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server data storage systems may further be interconnected with one or more other networks or other connection mediums, such as a high-bandwidth connection over which the storage systems may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 7 has been simplified for the purposes of explanation, and that the number and organization of host computing systems, server block data storage systems and other devices may be much larger than what is depicted in FIG. 7. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, a data center may execute tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 7 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 7, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/ distinct networks.

In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a system manager module, can call into the data plane to allocate the desired amount of storage from the available resources, and can provide the customer with an identifier for the data volume. In some embodiments, the customer then can call an "Attach Volume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "Detatch Volume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

Figure 8:
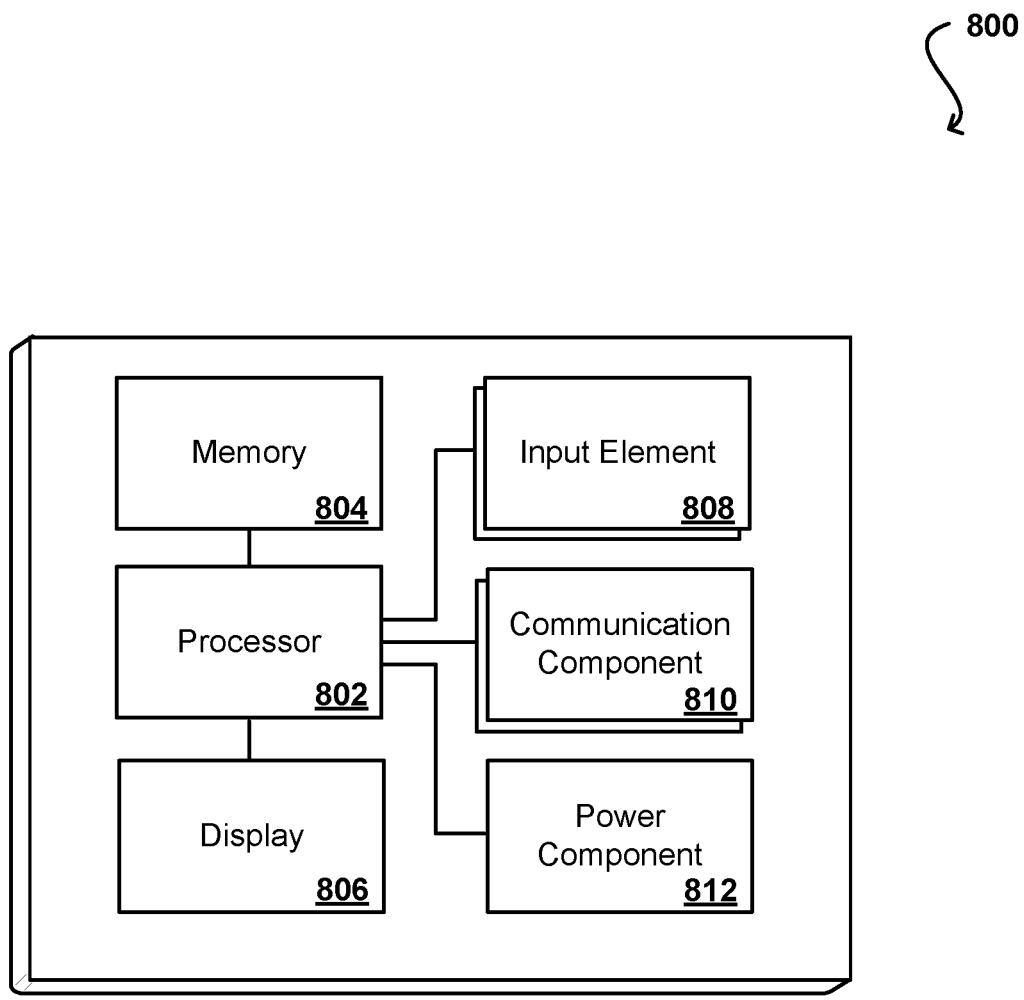
FIG. 8 illustrates components of an example computing device that can be used to perform aspects of the various embodiments.

FIG. 8 illustrates a logical arrangement of a set of general components of an example computing device 800. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one input element 808 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 800 of FIG. 8 can include one or more network interface or communication elements or components 810 for communicating over various networks, such as a Wi-Fi, Bluetooth, RF, wired, or wireless communication systems. The device in many embodiments can communicate with a network, such as the Internet, and may be able to communicate with other such devices. The device will also include one or more power components 812, such as power cords, power ports, batteries, wirelessly powered or rechargeable receivers, and the like.

Example environments discussed herein for implementing aspects in accordance with various embodiments are primarily Web-based, as relate to Web services and cloud computing environments, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   determining a vulnerability in a cloud resource template that includes one or more portions;
   providing, to a fixer service, vulnerability data associated with the vulnerability including at least identifying information and location information for the vulnerability;
   identifying, using the location information, a location of the vulnerability along a path in a tree structure representation of the one or more portions;
   determining, based at least the vulnerability data, a remediation rule for the vulnerability;
   applying steps of the remediation rule to the one or more portions associated with the vulnerability to create a patched cloud resource template;
   determining the patched cloud resource template solves a problem associated with the vulnerability; and
   providing the patched cloud resource template to a provisioning service.

2. The computer-implemented method of claim 1, further comprising:
   generating the tree structure representation of the one or more portions; and
   tracing a path, through the tree structure representation, from a root node to a node associated with the vulnerability.

3. The computer-implemented method of claim 1, further comprising:
   determining a detection rule used to identify the vulnerability, wherein the remediation rule is selected based, at least in part, on the detection rule.

4. The computer-implemented method of claim 1, further comprising:
   generating a patch associated with the vulnerability, the patch including at least one of changing a variable value, adding a line of code, or removing a line of code.

5. The computer-implemented method of claim 1, wherein the patched cloud resource template is evaluated using an automated reasoning-based analysis.

6. A computer-implemented method, comprising:
   determining, using a cloud resource template file parsed into one or more segments, a location within a segment of the one or more segments of the cloud resource template file associated with a security finding, the security finding including at least a description of a vulnerability and location information;
   selecting, based at least on the description, a remediation workflow for the vulnerability;
   executing the remediation workflow to change one or more portions of the segment associated with the vulnerability;
   generating an output patched cloud resource template file including the one or more portions changed according to the remediation workflow; and
   providing the output patched cloud resource template file to a validation service.

7. The computer-implemented method of claim 6, wherein the cloud resource template file comprises a tree representation of the one or more segments.

8. The computer-implemented method of claim 7, further comprising:
   identifying a path along the tree representation, the path including the vulnerability and one or more additional nodes associated with the vulnerability.

9. The computer-implemented method of claim 6, wherein the remediation workflow includes at least one of changing a variable value, adding a line of code, or removing a line of code.

10. The computer-implemented method of claim 6, further comprising:
    selecting a detection rule from a plurality of detection rules;
    analyzing, using the detection rule, the one or more portions; and
    determining the vulnerability within the one or more portions.

11. The computer-implemented method of claim 6, further comprising:
    receiving a plurality of locations associated with a plurality of vulnerabilities;
    selecting a first vulnerability from the plurality of vulnerabilities;
    patching one or more portions associated with the first vulnerability;
    verifying the one or more portions after the patching;
    selecting a second vulnerability from the plurality of vulnerabilities; and patching one or more second portions associated with the second vulnerability after completion of the verifying for the first vulnerability.

12. The computer-implemented method of claim 6, wherein the cloud resource template file comprises contextual information for the one or more segments of the cloud resource template file.

13. The computer-implemented method of claim 6, wherein the remediation workflow is based, at least in part, on a rule-based approach used to identify the vulnerability.

14. The computer-implemented method of claim 6, wherein the validation service includes applying an automated reasoning-based analysis.

15. A system, comprising:
   at least one processor; and
   memory including instructions that, when executed by the at least one processor, cause the system to:
      determine, using a cloud resource template file parsed into one or more segments, a location within a segment of the one or more segments of the cloud resource template file associated with a security finding, the security finding including at least a description of a vulnerability and location information;
      select, based at least on the description, a remediation workflow for the vulnerability;
      execute the remediation workflow to change one or more portions of the segment associated with the vulnerability;
      generate an output patched cloud resource template file including the one or more portions changed according to the remediation workflow; and
      provide the output patched cloud resource template file to a validation service.

16. The system of claim 15, wherein the instructions when executed further cause the system to:
   generate, from wherein the cloud resource template file comprises a tree representation of individual segments of the one or more segments.

17. The system of claim 16, wherein the instructions when executed further cause the system to:
   identify a path along the tree representation, the path including the vulnerability and one or more additional nodes associated with the vulnerability.

18. The system of claim 15, wherein the remediation workflow includes at least one of changing a variable value, adding a line of code, or removing a line of code.

19. The system of claim 15, wherein the instructions when executed further cause the system to:
   select a detection rule from a plurality of detection rules;
   analyze, using the detection rule, the one or more portions; and
   determine the vulnerability within the one or more portions.

20. The system of claim 15, wherein the instructions when executed further cause the system to:
   receive a plurality of locations associated with a plurality of vulnerabilities;
   select a first vulnerability from the plurality of vulnerabilities;
   patch one or more portions associated with the first vulnerability;
   verify the one or more portions after the patching;
   select a second vulnerability from the plurality of vulnerabilities; and
   patch one or more second portions associated with the second vulnerability after completion of the verifying for the first vulnerability.

* * * * *